Nov. 24, 1970 O. JENSEN 3,543,089

SIGNALING SYSTEM FOR TRANSMITTING INFORMATION BETWEEN POINTS OF DIFFERENT POTENTIAL

Filed Jan. 22, 1968 6 Sheets-Sheet 1

INVENTOR.
OTTO JENSEN

BY

OSTROLENK, FABER, GERB & SOFFEN

ATTORNEYS

Nov. 24, 1970 O. JENSEN 3,543,089

SIGNALING SYSTEM FOR TRANSMITTING INFORMATION BETWEEN POINTS OF DIFFERENT POTENTIAL

Filed Jan. 22, 1968 6 Sheets-Sheet 2

SIGNALING SYSTEM FOR TRANSMITTING INFORMATION BETWEEN POINTS OF DIFFERENT POTENTIAL

Filed Jan. 22, 1968

INVENTOR.
OTTO JENSEN
BY
OSTROLENK, FABER, GERB & SOFFEN
ATTORNEYS

INVENTOR.
OTTO JENSEN

BY

OSTROLENK, FABER, GERB & SOFFEN

ATTORNEYS

INVENTOR.
OTTO JENSEN

BY

OSTROLENK, FABER, GERB & SOFFEN

ATTORNEYS

United States Patent Office 3,543,089
Patented Nov. 24, 1970

3,543,089

SIGNALING SYSTEM FOR TRANSMITTING INFORMATION BETWEEN POINTS OF DIFFERENT POTENTIAL

Otto Jensen, Malvern, Pa., assignor, by mesne assignments, to I-T-E Imperial Corporation, Philadelphia, Pa., a corporation of Delaware Filed Jan. 22, 1968, Ser. No. 699,628
Int. Cl. H02h 7/16, 1/00, 33/12
U.S. Cl. 317—12 12 Claims

ABSTRACT OF THE DISCLOSURE

A signaling system for insulatingly transmitting information between two points of different potential. At one potential level is located an energizable relay, while at the second point of differing potential are located the contacts associated with such relay. A rod of insulative material spans the two different points and interconnects the relay with the contacts, such that energization of the relay effectuates movement of the contacts.

This invention relates to signaling systems and, more particularly, to a means for transmitting information between points of different potential.

On many occasions it is desirable to be able to transmit information between points or areas of different potential. Thus, in United States patent application Ser. No. 701,224, filed Jan. 29, 1968, in the name of Murray K. Price and Otto Jensen, entitled "Capacitor By-Pass Protective System," and assigned to the assignee of the instant invention, there is disclosed a protective arrangement for a capacitor bank inserted in a high-voltage transmission line wherein many components of the protective system are situated at platform level and many other cooperating components of the system are advantageously located at ground level. As explained in greater detail in the aforementioned Price and Jensen United States patent application Ser. No. 701,224, monitoring devices are situated at platform level to detect various abnormalities occurring in the transmission line and to generate by-pass and/or lock-out signals in response thereto. Since the by-pass and/or lock-out mechanism is located at ground potential, means must be provided to transmit the by-pass and/or lock-out signals to ground. Furthermore, since the platform and ground operate at vastly different potentials, such signaling means must insulatively transmit such signals therebetween. The instant invention provides such a signaling system for insulatively transmitting information between the platform and ground. It is to be understood, however, that although the instant invention will be specifically described within an overall protective scheme, such as that disclosed and claimed in the aforementioned Price and Jensen U.S. patent application Ser. No. 701,224, the instant invention is not to be limited to such environment, but may be broadly thought of as providing a signaling system for insulatively transmitting information between any two points having different potentials.

In a preferred embodiment, the instant invention includes an energizable relay situated at a first potential level and contacts associated therewith which are located at a second potential level. Means in the form of an insulating signaling rod interconnect the relay and contact, such that energization of the relay located at the first potential level will generate information contact (by way of the movement of contacts) at the second potential level.

Accordingly, it is an object of the instant invention to provide a signaling system for insulatively transmitting information between two points of differing potential levels.

Another object of the instant invention is to provide such a signaling system which is particularly useful in a capacitor by-pass protective system wherein various components thereof are operable at different potential levels.

Further objects and a better understanding of the instant invention may be had by referring to the following description and drawings, in which.

Figure 1:
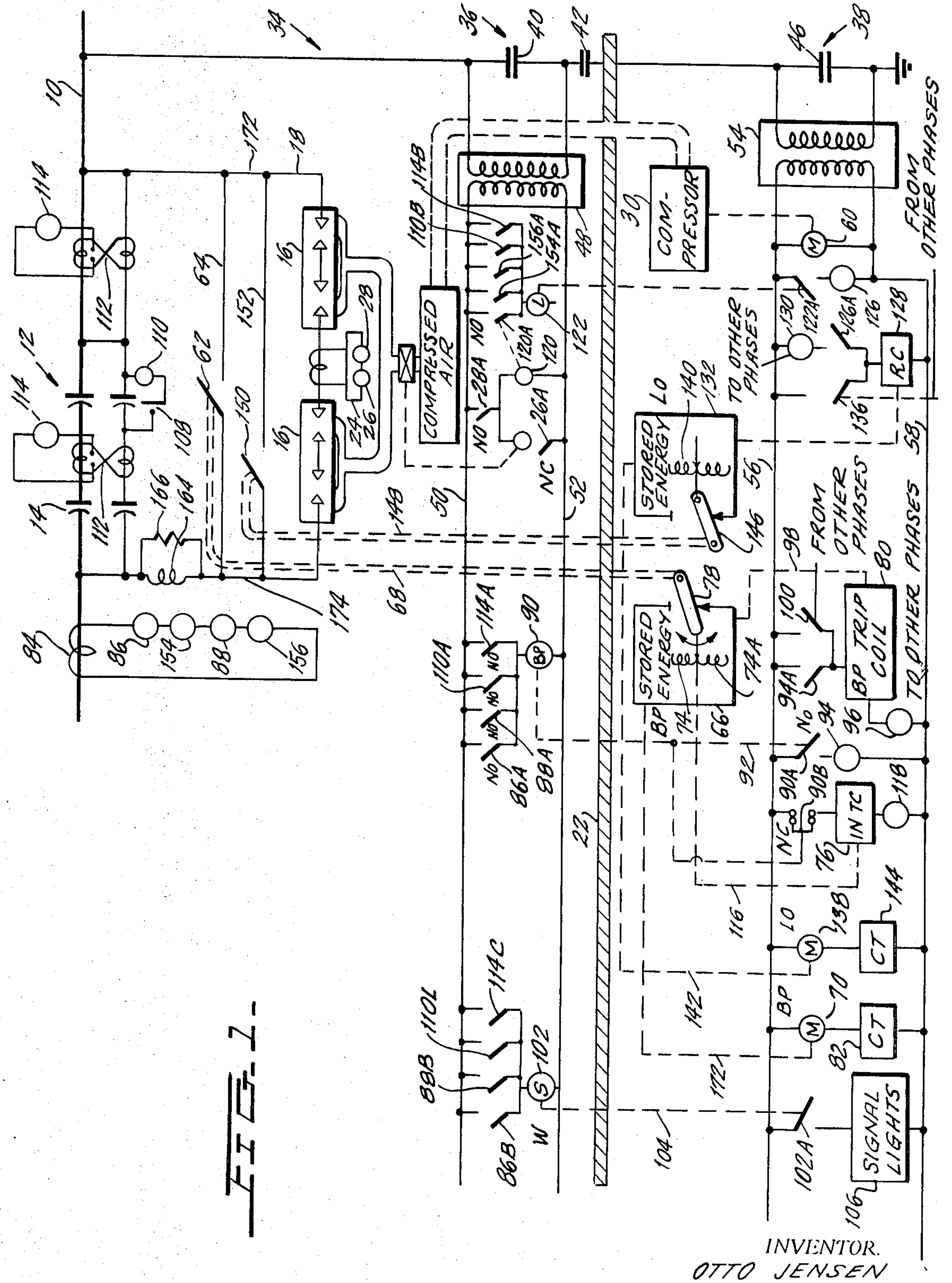
FIG. 1 is a schematic diagram illustrating a complete by-passing protective arrangement embodying the teachings of the instant invention.

Since the instant invention is particularly useful in a protective system for a capacitor bank, such as the one illustrated in the aforementioned Price and Jensen United States application Ser. No. 701,224, the description of that system, which follows, will explain in detail the nature of the instant invention:

It will be appreciated, that although a single phase 10 and a single capacitor bank 12 have been shown in FIG. 1, in a multi-phase system, there would be a similar capacitor bank provided in each phase. Similarly, it is to be understood that although the following discussion will describe a protective arrangement for the capacitor bank 12 of FIG. 1, a similar protective arrangement would be provided for each capacitor bank, utilized in a multi-phase system.

Broadly speaking, the purpose of the protective system of the instant invention is to protect the capacitor bank 12 from the various abnormalities which may occur within the bank 12, or along the transmission line 10. Being more specific, it may be appreciated that the occurrence of severe faults within the transmission line 10 (such as those which occur during short-circuits) required that the capacitor bank 12 be instantaneously removed from the transmission line. The apparatus usually utilized in the prior art to effectuate such operation includes a spark gap in parallel with the capacitor bank, which spark gap is designed to instantaneously arc over, once a predetermined voltage, proportional to the line current, is applied across the bank. When the gap fires a low impedance path is established in parallel with the capacitor bank, thereby effectively removing the capacitor bank from the transmission line.

The protective arrangement of the instant invention incorporates such spark gap operation to by-pass the capacitor bank 12 in the event of instantaneous faults within the transmission line 10. Thus a pair of double ended spark gaps 16 are inserted in a parallel path 18 with the capacitor bank 12 and are so designed as to arc over and thereby by-pass the capacitor bank 12, upon the occurrence of a predetermined potential.

Although the instant invention is in no way limited hereto, a particularly advantageous spark gap construction useful in the system of the instant invention is disclosed and claimed in U.S. patent application Ser. No. 568,942, filed July 29, 1966, in the name of Otto Jensen and entitled Protective Arrangement for Series Capacitor Bank.

As noted earlier, regardless of the construction of the spark gap chosen, all spark gaps continue to conduct current (even when the fault has subsided) until extinguished. One method of extinguishing the arc is to direct a blast of compressed gas into the spark gap as illustrated in the aforementioned Jensen application Ser. No. 568,942. As is explained in greater detail in said application, compressed air is stored on the platform which supports the capacitor bank and spark gaps, and is released to extinguish the gap upon the activation of various control circuits, which are in turn responsive to detection devices which monitor the flow of current through the line. Although the utilization of such a system is not a prerequisite, its utilization and description with respect to FIG. 1 illustrates a broad aspect of the instant invention.

Figure 2A:
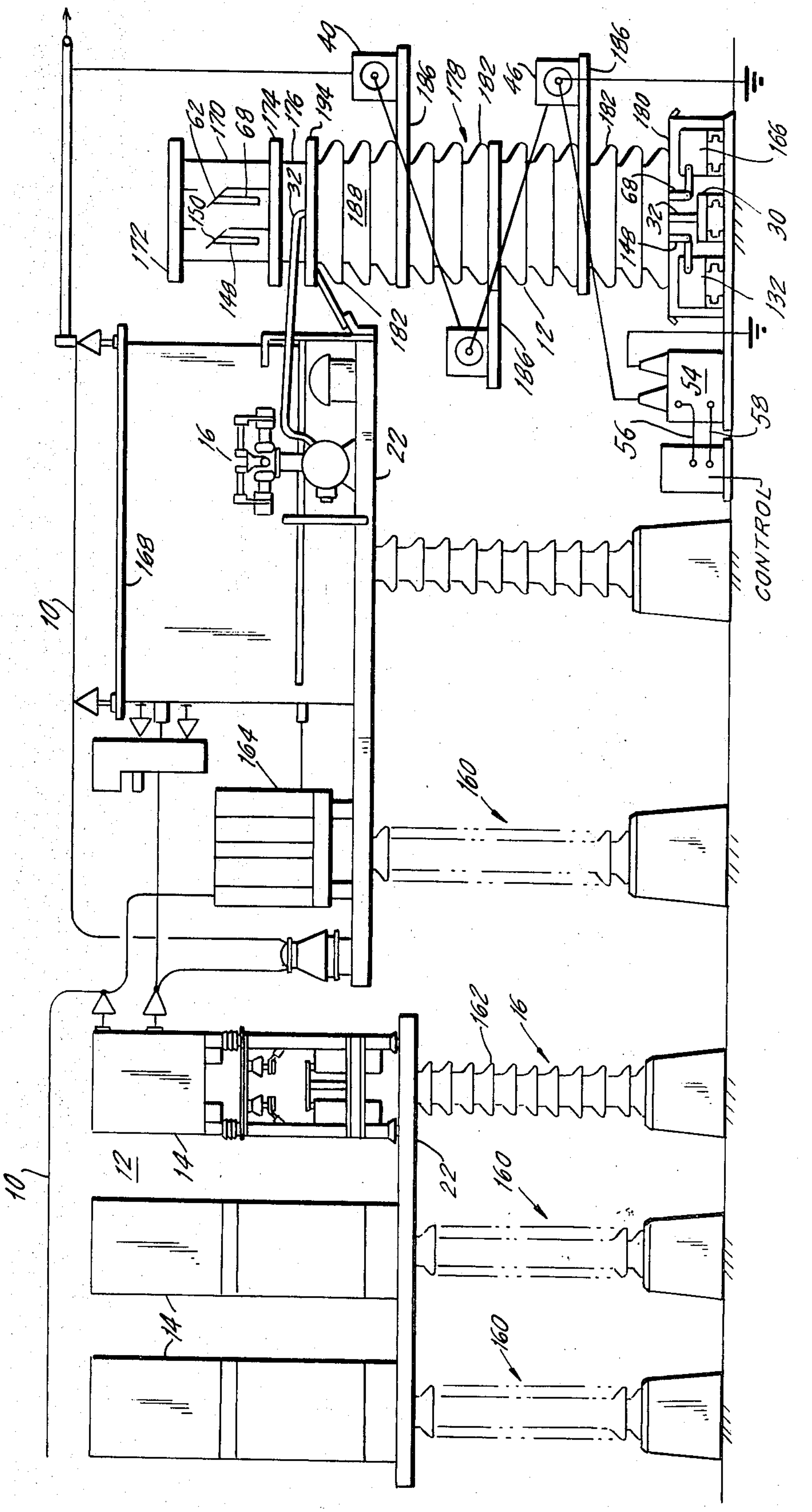
FIG. 2A shows a front elevation view of a capacitor installation and protective arrangement therefor constructed in accordance with the schematic diagram of FIG. 1.

Thus, in FIG. 1 a supply of compressed gas 20 is situated on the platform 22 beneath spark gaps 16 (see FIG. 2A). Assuming that a fault of predetermined magnitude has occurred, the spark gap 16 will arc over and conduct current, thereby taking the capacitor bank 12 out of the line. Upon the return of the line current to an acceptable value as detected by a monitoring circuit 24, various relays 26 and 28 will cooperate with their respective contacts 26A and 28A to either release the compressed gas in the tank 20 to extinguish the arc and thereby reinsert the bank 12 or alternatively, actuate lock-out mechanism (to be further described) for permanently by-passing the capacitor bank 12, in the event that the fault has not subsided within a predetermined time interval.

For a detailed discussion of operation of the various control circuits utilized to effectuate arc extinction in the above described mode, reference is made to the aforementioned Jensen application, which description is incorporated herein by reference thereto. For purposes of understanding one basic contribution of the instant invention it is sufficient to point out that such gap extinction system presents two immediate problems. First, it is obvious that there must be a compressor of some type to replenish the storage tank 20 after an extinction operation. The location of this compressor presents the problem. Secondly, there must be control power available to power the compressor and various control circuits utilized in the system.

With respect to the first problem, the compressor might be located on the platform 22 relatively close to the storage tank 20. However, it will be appreciated that if the compressor were located on the platform, it would be situated at platform potential (nearly equal to line potential) and be unavailable for servicing and maintenance while the line was in service.

A first aspect of the protective system of the instant invention proposes that as many components as possible be situated at ground level, and operable at ground potential with various means being provided to insulatively interconnect the various cooperating components situated at platform and ground respectively. When this concept is applied to the gap extinction system illustrated in FIG. 1, the compressor 30 is situated at ground level and means in the form of conduit path 32 insulatively interconnects the ground level component of the system, the compressor 30, with the platform level element of the system, the storage tank 20.

The second problem referred to previously was described as the need for an auxiliary power supply to operate the various components of the gap extinction system. The prior art has suggested current transformers tapped off the transmission line 10, but as noted earlier, this solution has presented problems, such as the need for current flow through the line 10 in order to keep the various components operable.

A second aspect of the instant invention solves the prior art difficulty by proposing the use of voltage sources derived from the transmission line (such that the auxiliary components will operate even though no current is flowing through the line, so long as potential is applied to it) while at the same time, this second aspect of the invention complements the first aspect by providing a voltage divider network generally illustrated at 34 in FIG. 1 which at one end, 36, will provide a potential source at substantially platform potential, while at the other end, 38, will provide a potential source which is relatively close to ground potential. The potential source at platform potential operates those components of the system which are situated on the platform while the potential source at ground level operates those components of the system situated at ground level.

Specifically, the voltage divider 34 comprises a plurality of capacitors, such as 40, 42 and 46, interposed in electrical series between the transmission line 10 and ground with the uppermost capacitor 40, when combined with a suitable step-down transformer, 48, providing operating potential between the lines 50 and 52 for operating the various control circuits at platform potential; while the lowermost capacitor 46, when combined with a suitable step-down transformer 54, will provide a relatively low potential power source between lines 56 and 58 for operating the various components of the system which are at ground level such as the motor 60, utilized to operate the compressor 30.

Turning now to the aspect of the protective system of the instant invention dealing with protection against abnormalities, such as overloads, which persist for a predetermined length of time; the occurrence of these conditions necessitates a by-passing sequence in order to protect the capacitor bank and means to reinsert the capacitor bank once the abnormality has subsided. In providing this type of subsystem, the instant invention again utilizes the principle that as many components as possible of the system should be located at ground level, and means provided to insulatively interconnect the various components at ground level with the associated parts at platform potential. Thus bypass switch means 62 to be described in greater detail, is situated in a second parallel path 64 and operable to bypass and insert the capacitor bank 12 by means of operating mechanism 66, situated at ground level. In accordance with the invention, means in the form of insulative power rod 68 interconnects the switch contacts 62 with the operating mechanism 66.

The operating mechanism 66 is preferably of the stored energy type employing large springs which are compressed by a stepping ratchet and driving pawl arrangement (schematically illustrated at 72) operated by a motor 70 in the manner shown and claimed in U.S. Pat. No. 2,961,067 issued to R. V. Starr, entitled "Electrically Operated Stored Energy System for Circuit Breakers." Although the specific manner of charging the spring 74 is not the subject of the instant invention, it is important to point out that in accordance with the instant invention, the motor 70 of such a spring charging system would derive its operating potential from the lines 56 and 58 connected through the transformer 54 to the capacitor 46 of the voltage divider network 34.

In operation, the motor 70, through the linkage 72, compresses the spring 74. Control circuitry generally indicated at 82 and described in greater detail in the Yarrick et al. 2,961,068 patent functions to interrupt the cricuit through to motor 70, once the spring 74 is completely charged.

Assuming that the bypass switch 62 is closed so that the capacitor bank 12 is electrically out of the line 10; upon the energization of an insert trip coil 76, which, as will be further described, occurs when the abnormality which initially carried the compressed spring 74, is released to rotate arm 78, which in turn, through the bypass power rod 68 opens the switch 62, thereby reinserting the capacitor bank 12 into the line 10.

While the spring 74 was expanding, a second spring 74A is compressed and stores sufficient energy to rotate the arm 78 in the opposite direction to close the switch 62 when a bypass trip coil 80 is energized, in a manner to be further described, by the occurrence of a new abnormality. Meanwhile, once the main spring 74 has been discharged to interrupt parallel path 64 and insert the capacitor bank, the motor 70 is actuated once again to recharge the springs 74. Further details on the charging mechanism and control circuitry, therefore, may be had by referring to the aforementioned Yarrick and Starr patents, the contents of which are incorporated herein by specific reference thereto. In the bypass operation described above, it will be apparent that there will be provided detection elements to monitor the line conditions and generate bypass and insert command signals in response to the occurrence and subsistence of the various faults. Since these monitoring devices must operate at line potential, means must be provided to transfer these signals to ground whereby the operating mechanism 66 can be actuated to open and close the switch 62. Another aspect of the invention provides such a signalling system.

Specifically, a monitoring circuit 84 is inductively coupled to the line 10. Overload and/or underload bypass relays 86 and 88, respectively, are activated upon the occurrence of predetermined overloads or underloads occurring in the line 10.

Associated with the overload bypass relay 86 are normally open contacts 86A, which close whenever the overload bypass relay 88 has normally open contacts, 88A associated therewith, which also will close upon the activation of underload bypass relay 88 responsive to a predetermined underload in a line 10. The closing of contact 86A or 88A will establish a cricuit path from line 50 to 52 through bypass signal coil 90.

Bypass coil 90 has associated therewith, at ground level, normally open contacts 90A and normally closed contacts 90C. As will be explained in greater detail, both contacts 90A and 90B are operable to their opposite state by the movement of an insulative bypass signal rod 92 in response to energization of bypass relay 90. It will be appreciated that this signalling system transfers information between levels of different potential.

Closing of the normally opened contact 90A completes a circuit path between power lines 56 and 58 through relay 94, the normally open contacts 94A of which are closed to complete a circuit path through the bypass trip coil 80 and relay 96.

An indicated previously, the energization of the bypass trip coil 80 releases the spring 74 of bypass operating mechanism 66 (the link between the coil 80 and the operating mechanism 66 being schematically illustrated by the phantom line 98) to rotate the arm 78 which in turn, through the bypass power rod 68, causes the closing of switch means 62. The very fast operation of the bypass mechanism from the moment of discharge of the spring 74 through the movement of power rod 68, permits a very rapid insertion of the switch 62 in paths 64 (in a manner to be more fully explained) thereby quickly bypassing the capacitor bank 12 to protect it from the fault which initially triggered the activation of the overload or underload bypass 86 or 88 respectively.

It should also be pointed out that the energization of the relay 96 causes it associated normally opened contacts located in other phases of the system (not shown) to close thereby effectuating the energization of the respective bypass trip coils in those phases to initiate a similar bypass operation, thereby preventing a condition known as single phasing. Similarly, normally opened contacts 100 in parallel with contacts 94A will close to energize bypass trip coil 80 to initiate bypass operation in line 10 in response to the occurrence of faults detected in other phases of the system.

It is to be understood that the above described communication arrangement provided by the instant invention for signaling between platform and ground level may be utilized simply to provide the energization of warning signals on the ground instead of and/or in addition to the generation of bypass command signals as previously explained. Thus overload bypass relay and underload bypass relay 86 and 88 respectively could be provided with a second pair of normally opened contacts 86B and 88B, which when closed provide a circuit between the power lines 50 and 52 through a warning signal relay 102, which when energized moves the insulation signal rod 104 to close the normally opened contacts 102A at ground level which thereby completes a circuit between power lines 56 and 58 through the warning light schematically illustrated at 106.

In addition to providing a bypass operation in response to overloads and underloads, the instant invention can be utilized to initiate a bypass operation in response in response to many other harmful conditions which may occur on the bank. Two such conditions are illustrated in FIG. 1, it being understood that the basic principles of the instant invention may be utilized to monitor any condition desired and to initiate bypassing action in response thereto. Thus a thermostatic type of temperature responsive monitoring element 108 can be provided to sense abnormal heat conditions within an individual capacitor unit 14 and a relay 110 energized when the sensing element completes a circuit therethrough. Relay 110 has normally open contacts 110A associated therewith which close upon the energization of the relay to establish a circuit path through the bypass relay 90. As described above, by means of the bypass signal rod 92, the control circuitry at ground level will be activated to energize the bypass strip coil 80 which releases the energy in the operating mechansim 66 to close the bypass switch means 62.

Similarly, current sensing elements 112 may be inserted in the individual sections of the capacitor bank 12 to detect current imbalance in the various capacitor strings such as might be caused by the loss of more than one capacitor unit per string. In such case, relays 114 associated therewith would be energized to close the normally open contacts 114A which in turn energize the bypass relay 90 to initiate the bypass operation in the manner previously described.

In the event the fault which has caused the bypass operation subsides, then the relay associated with that fault (relay 86, 88, 110 or 114) is deactivated and by means of internal springs (not shown) the various contacts associated therewith (86A, 88A, 110A, 114A) will revert to their normally opened condition thereby interrupting the current load through the bypass relay 90. By means of springs not shown in FIG. 1, the bypass signal rod 92 will revert to its initial condition thereby returning contacts 90A and 90B to their normally opened and normally closed positions respectively. When contact 90B is closed, the insert trip coil 76 is energized which in turn, through the link schematically designated 116, releases the spring 74 of the bypass operating mechanism 66 which in turn through the power rod 68, opens the switch means 62 and reinserts the capacitor bank 12 back into the line.

Summarizing the various bypass and insert operations described thus far, it will be appreciated that the system thus described has combined two somewhat related subsystems. Thus one signalling subsystem of the instant invention permits monitoring devices to be installed at line potential and the occurrence of predetermined conditions to be insulatively communicated to ground level. The second subsystem is, in effect, responsive to these signals and initiates the operating of mechanism at ground level, the energy from which is then transferred back to the associated switch on the platform level. In this manner, both the operating mechanism for the bypass switch, and in addition the various control circuitry associated therewith is at ground potential and always available for servicing and maintenance.

Also to be appreciated is the fact that both of these two related subsystems take advantage of the previously mentioned aspect of the invention dealing with the voltage divider 34. Thus all platform level circuitry derives its power from capacitor 40 while all ground level components derive auxiliary electrical power from capacitor 46.

As noted previously, when a fault has persevered for a predetermined length of time, it is usually the indication that there is something critically wrong with the system. Thus in prior art protective systems and in the protective system of the instant invention means are provided to "lockout" the capacitor bank in the event that a particular fault fails to return to acceptable values within a predetermined period of time. Thus the sequence is normally the occurrence of a harmful condition; taking the capacitor bank out of the line automatically (by it by a bypass operation or a spark gap operation); and finally if the harmful conditions prevail, the establishment of a permanent bypass about the capacitor bank which cannot be interrupted without the intervention of a human operator.

To this end, that subsystem of the instant system which is directed to spark gap operation employs a system similar to that described and claimed in the aforementioned Jensen application 568,942. Thus, as explained in greater detail in the aforementioned Jensen application 568,942, when the normally opened contact 28A is closed, a time delayed relay 120 begins to operate.

Time delay relay 120 has normally open contacts **120*a* associated therewith which will be closed by time delay relay 120** if it is not deenergized within a predetermined time integral.

Thus, if relay 26 does not sense, within the predetermined period, that the line current is returned to acceptable value, and initiate the release of compressed gas to extinguish the arc in gaps 16, contacts **120*a* will close to establish a current path between lines 50 and 52 through the lock-out relay 122, part of the signaling system for communicating the lock-out signal from platform potential to ground. As will be further described, and as was the case with the bypass signaling system and warning light signaling system previously described, energization of the lock-out relay 122 actuates lock-out signal rod 124 to close normally opened contacts 122*a*, thereby establishing a circuit path between lines 56 and 58 and a relay 126. Energization of relay 126 closes normally opened contacts 126*a*, thereby completing a circuit path through the lock-out trip coil 128 and a relay 130**.

Energization of lock-out trip coil 128 initiates discharge of lock-out operating mechanism 132 through the link schematically illustrated at 134, while energization of relay 130 causes the closing of associated contacts in other phases of a multi-phase system to provide an insert command signal in the other phases. Similarly, normally opened contacts 136 are provided in parallel with contacts **126*a*** and are closed upon energization of an associated relay in other phases of the system thereby initiating the lock-out operation in the phase illustrated in FIG. 1 in response to the occurrence of lock-out signals generated in other phases.

It will be appreciated that since all ground level circuitry in a multiphase system will operate at the same potential level, it is easy to interconnect the various phases.

Lock-out mechanism 132 is similar to bypass operating mechanism 66. It is of the type illustrated in the aforementioned Starr and Yarrick patents. Thus a lock-out motor 138 charges an internal spring 140 (through the link schematically illustrated at 142) and has control circuitry schematically illustrated at 144 for disconnecting the motor 138 once the spring 140 is fully charged.

Thus reception of the signal from the lock-out trip coil 128 permits discharge of the spring 140 to rotate arm 146 which in turn moves the lock-out power rod 148 to close the lock-out switch means 150 located in another parallel path 152 on the capacitor platform.

To provide lock-out operation in response to other types of faults which exist for predetermined lengths of time, time delayed overload and underload lock-out relays 134 and 156 are provided in the monitoring circuit 84. If the various faults detected by these relays have not subsided within the operating time chosen for the time delayed relays, the respective contacts **154*a* and 156*a* will close to energize lock-out relay 122 which in turn, through the lock-out signal rod 234, will close the contacts 122*a*** at the ground level control circuitry to initiate the lock-out operation.

Similarly, time relays (not shown) in the sensing circuits 108 and 112 could include contacts such as **110*b* and 114*b* to initiate the lock-out operation in the event that these particular abnormal conditions have not returned to acceptable values within predetermined time limits. Similarly, the lock-out time delays (not shown) may cooperate with associated contacts such as 110*c* and 114*c* to energize the warning signal relay 102 to energize warning lights 106** at ground level to indicate a lock-out operation is imminent.

It may be noted that the essential difference between the lock-out function and the bypass function is that when the capacitor bank 12 has been bypassed by the switch 62 in response to the occurrence of abnormal conditions in the line and/or bank, such switch 62 will be opened automatically to reinsert the bank if the particular abnormality subsides within a predetermined time limit. If that fault has not subsided, the bypass switch 62 will remain closed and, in addition, lock-out switch contact 150 (permanently signifying that contact 150 cannot be opened without the intervention of a human operator). Furthermore, as will be shown in greater detail, interlocking means are provided whereby in the event that both the bypass and lock-out operation has occurred, and after the system is entirely cleared, before the bypass contact 62 can be opened in an attempt to reinsert the capacitor bank 12, the lock-out switch contact 150 must be opened first.

Thus a basic protective system for a capacitor bank has been disclosed, it being understood that the various subsystems described cooperate with one another to define an overall protective system. However, it is to be understood that the various subsystems may also be practiced without the utilization of each and overy other subsystem. For example, the bypass operating mechanism could be utilized without a lock-out mechanism or vice versa or either one or both could be used with or without the particular spark gap system that has been described. However, regardless of which combination of elements or whether the entire system is utilized, basic contributions of the instant invention should be apparent. Thus a first aspect of the instant invention makes possible the utilization of many components of the various subsystems at ground level. These elements at ground level are always available for maintenance and inspection even when the platform is energized at high potential. Secondly, there has been provided insulative means to interconnect the various components at ground level with the cooperating operating mechanisms at platform potential. For example, the air duct 32 used in the compressed air system, and the lock-out and by-pass power rods 68 and 148 have been provided to insulatingly transfer power developed at ground level up to the platform. Additionally, signaling systems in accordance with the instant invention make possible transmission of information gathered at platform potential to the various control circuitries and mechanisms at ground level. Simultaneously, the instant invention has made possible the elimination of auxiliary platform energy sources and instead utilizes a basic capacitor voltage divider which makes potential energy available at the two different potential levels at which the various components of the protective system are operating.

In addition to making the ground level equipment available for safe inspection and maintenance at all times, the invention facilitates intercommunication between phases.

Furthermore, it is to be appreciated that the concept of providing potential energy both at high platform potential level and at low ground level potential can be practiced in combination with a variety of systems including one or more of the individual subsystems which form other aspects of the instant invention.

Turning now to FIGS. 2A through 7, there is shown the manner in which the protective system, schematically illustrated in FIG. 1, may be implemented to provide a complete protective station for a capacitor bank in a high voltage transmission line. Thus, in FIGS. 2A and 2B there is shown the platform 22 insulatively maintained above ground by the insulator columns 160, preferably comprising a plurality of stacks individual insulator cones 162, the number of which would depend upon the voltage of the line being carried.

Supported upon the left hand portion of the platform 22, as viewed in FIG. 2A, is the capacitor bank 12 in series with the transmission line 10. As noted with respect to FIG. 1, the capacitor bank 12 comprises a plurality of individual capacitor units 14 arranged in series parallel relationship to provide the desired reactance.

Supported upon an adjacent portion of the platform 22 is that portion of the protective system of FIG. 1 which operates at platform potential. Specifically, a reactance 164 in parallel with a resistance 166 (see FIG. 2B) is provided at platform potential (see also FIG. 1) to function as a current limiter during the occurrence of faults within the line 10.

Situated within a protective housing 168 is the spark gaps 16 situated upon the storage tank 20, with the monitoring transformer and relays 26 and 28 associated therewith being in series between the spark gaps 16.

Also within the enclosure is the transformer 48 in parallel with the top capacitor 40 of the voltage divider network 34 of FIG. 1, and the control circuitry at platform potential which is established between the power lines 50 and 52.

As will be explained in greater detail, the bypass and lock-out switch means 62 and 150 are housed in a cylindrical tube 170 at platform potential with the terminals 172 and 174 thereof established in parallel about the spark gaps 16 and capacitor bank 12. The bypass lock-out tube 170 is supported upon transition tube 176, to be described in greater detail, which, in turn, is supported upon a multipurpose insulator column 178, which, in turn, is supported upon an enclosure 180 which houses the bypass operating mechanism and lock-out operating mechanism 66 and 132, respectively, as well as compressor 30, all at ground level. Also, at ground level is transformer 54 which is in parallel with the lowermost capacitor 46 of the voltage divider 34, as well as the ground level control circuitry and various associated components which are operable by the potential level developed between the power line 56 and 58.

Multipurpose Insulating Column 178 is described in greater detail and claimed in United States patent application Ser. No. 699,624, filed Jan. 22, 1968, in the name of Otto Jensen and entitled "Multipurpose Insulating Column," and assigned to the assignee of the instant invention.

Column 178 is preferably comprised of a plurality of hollow modular insulator segments 182 stacked upon one another. Separating each of the modular components 182 is a supporting platform 186 which supports the various capacitors 40, 42 and 46 of the voltage divider 34 schematically shown in FIG. 1. Thus, it will be seen that a first function of the insulator column 178 is to insulatingly support platform level bypass and/or lock-out tube 170 with respect to the ground. The second function of the tube 178 is to support the capacitor units defining the voltage divider network by which platform potential and ground potential energy sources are made available at either end thereof.

FIG. 2A illustrates two further functions of the insulator column 178 in the protective system of the instant invention. Thus, as schematically illustrated in FIG. 2A, the by-pass operating mechanisms 66 and the lock-out power mechanisms 152 are situated beneath the insulator column 178 such that the by-pass and lock-out power rods 58 and 148, respectively, extend vertically up through hollow insulator column 178 and into cooperative relationship with the by-pass and lock-out switch means 62 and 150, respectively, schematically illustrated within the tube 170 of FIG. 2A. Thus, the third function of the multipurpose insulator 178 is to protectively house such power transferring rods which link the ground level mechanism and the associated platform level switches. Also, it will be shown that the insulating column protectively house signal rods, such as 92, 104 and 124.

Also, schematically illustrated in FIG. 2A is the manner in which the column 178 performs another function associated with the protective system of the instant invention. Specifically, the compressor 30 is situated beneath the column 178, such that the conduit path 32 includes as a portion thereof the hollow interior 188 of the column 178. Specifically, conduit 32 enters one sealed end of the hollow column 178 and is in communication with the relatively large interior hollow passageway 188. At the opposite end column the tube 32 sealing by-passes through the sealed end of the column 178 and continues its way to the storage tank 20 on the platform 22. Thus, the enlarged hollow interior 188 of the insulating column 178 may be thought of as an integral portion of the conduit 32, and continuously aids in supplying gas from the compressor 30 to the gap extinction storage tank 20. Thus, in effect another function of the column 178 is to function as a pipe.

Finally, the insulator column 178 and the gas contained therein perform another function. Specifically, the compressor 30 maintains the gas within hollow interior 188 of the insulating column 178 under constant pressure. This compressed gas under pressure within the insulating column 178 itself performs a dual function in that it more adequately insulates the by-pass and/or lock-out mechanism tube 170 from ground level; while simultaneously, and in a manner to be further described, the pressure therein is utilized to maintain all the power rods and signaling rods passing therethrough in a state of constant tension to neutralize any buckling effect they may experience in operation.

Figures 3, 3A:
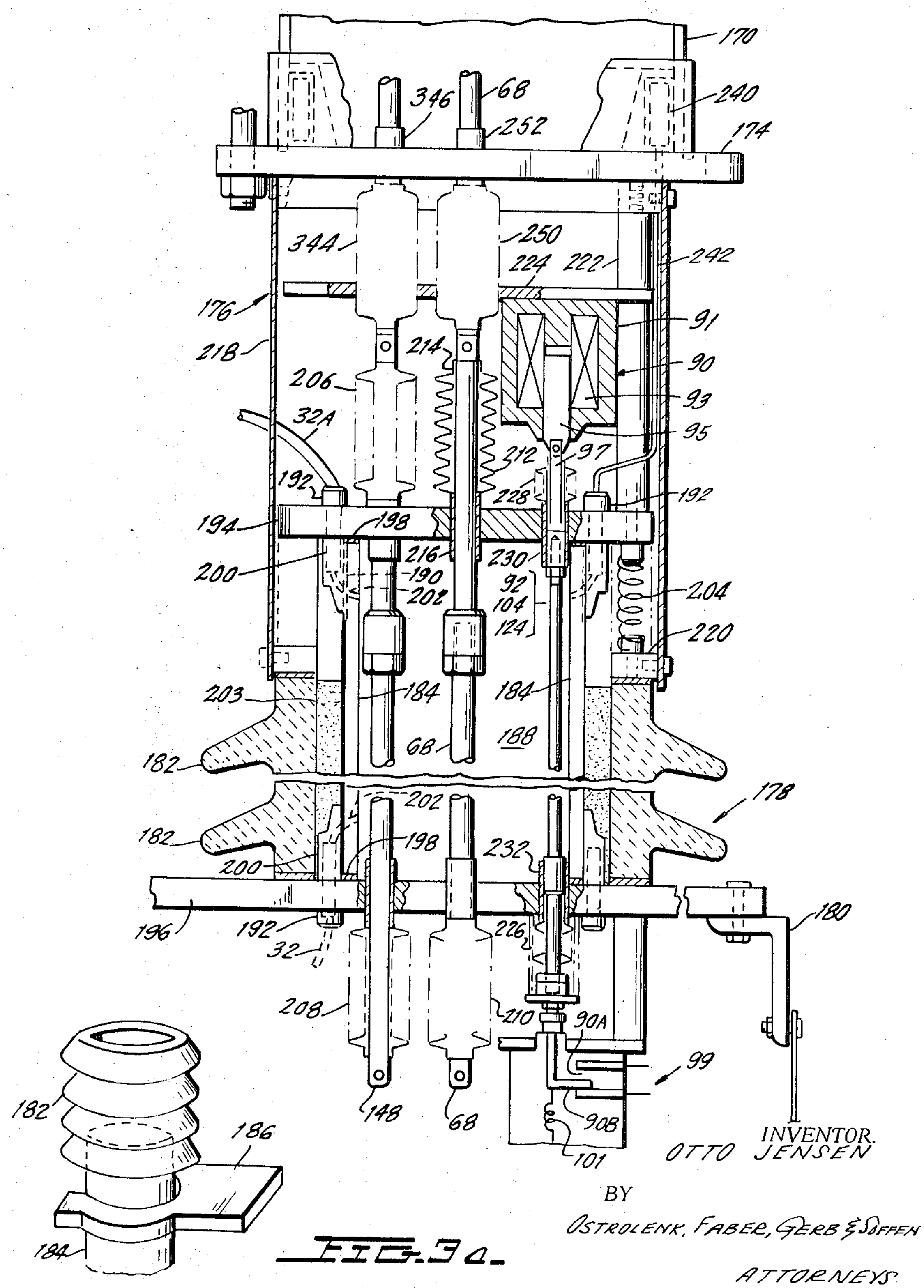
FIG. 3 is a view partly in section illustrating various features of the instant invention including the cooperation between a multi-purpose insulating column, a signal and transition compartment, and by-pass and/or lock-out switch.
FIG. 3A illustrates a portion of the insulating column of FIG. 3.

Turning to FIG. 3, it will be seen that the insulating column 178 includes an inner tube 184, preferably made of wound glass filament bonded with epoxy resins. It is the inner tube 184 which is filled with compressed air, thereby increasing the internal dielectric strength of the hollow interior 188.

The ends of the tube 184 are circumferentially threaded at 190 to receive termination fittings 192 which perform a dual function. First, the termination fittings 192 secure the inner tube 184 to end flanges 194 and 196, with suitable gaskets 198 being provided between the ends of the tube 184 and the flanges 192 and 196, respectively, to provide an airtight seal therebetween. Secondly, the termination flanges 192 are made hollow as indicated at 200, so as to communicate with apertures 202 provided on the tube 184.

Thus, conduit 32, communicating with the compressor, at one end, and the lower termination fitting at the other end. Conduit $32a$ communicates with the storage tank 20 on the platform at one end, and the upper fitting termination 192 at the other end. Thus, the complete conduit path is established between the compressor at ground level and the tank at platform level, which conduit path includes the hollow interior 188 of the tube 184 as a portion thereof.

The inner tube 184 is protected by concentric glaced porcelain tube segments 182 interspaced by a plurality of capacitor support platforms 186 in the manner systematically suggested by FIG. 3A.

The space between the inner tube 184 and the outer shorter tubes 182 is filled with a compound, such as $SF_6$ epoxy foam, to prevent surface condensation or the entrance of moisture that would impair the dielectric strength of the assembly.

The end flanges 194 and 196 project out of the outside radius of the tube segments 182. The total combined length of the outside tube segments 182 is made shorter than the inner tube 184, and compression springs 204 exert pressure between the flange 194 and the top of the last porcelain tube 182. This arrangement puts the porcelain segments 182 under compression and the inner tube 184 under tension, thus giving rigidity to the entire assembly and at the same time allowing for unequal thermal expansion.

FIG. 3 also illustrates the manner in which the power rods 66 and 148 are protectively housed within the hollow interior 188 of insulating column 178 and the manner in which the rods pass through the flanges 194 and 196, respectively, into the ground housing 180 at one end thereof and into the signal and transition stage 176 at the other end thereof. Specifically, associated with each of the power rods 68 and 148 and at both ends of each rod, outside of the respective flanges 194 and 196, are individual bellows units 206, 208, 210 and 212. As shown in detail for the unit 212, each of the bellows units is sealed at one end 214 to the respective rod 68 and at the other end to a cylindrical jacket 216 which is rigidly positioned in an associated aperture in the flange 194. The diameter of the power rod is slightly less than the inside diameter of the cylindrical jacket 216, whereby such power rod is free to slide.

It will be appreciated that the bellows arrangement described performs a dual function. First of all it performs the obvious function of maintaining the sealed integrity of the interior 188 of the column 178, while permitting the longitudinal displacement of the power rods therethrough. Secondly, it should be apparent that because of the slight difference in diameters of the rod and associated cylindrical jacket, a certain amount of compressed gas will escape the confines of the interior 188 into each of the bellows. Considering for example by-pass power rod 68, it will be apparent that such compressed gas in building up pressure against the interior of the bellows 210 and 212 will exert equal and opposite forces on the rod 68. Since the forces generated at each end of the power rod will be equal and opposite, they will have no net effect upon the transmission of power by the rod between the ground level operating mechanism and the platform level switch responsive thereto. However, these forces will always maintain the respective rods in tension at all times, thereby counterbalancing any possible tendency that such rods may have to buckle when they are being utilized as conveyor of compressive force rather than the conveyor of tension forces.

Also, and in a manner to be disclosed immediately below, the insulator column 178 protectively houses the various signal rods, such as 92, 104, and 124, which are used to transmit information between platform and ground level.

SIGNALLING MEANS BETWEEN HIGH VOLTAGE PLATFORM AND GROUND POTENTIAL

As suggested previously, one aspect of the instant invention makes possible the transmission of information between platform potential and ground level, whereby necessary steps can be initiated at ground level to begin various warning, by-pass, and or lock-out operations. FIG. 3 illustrates a preferred embodiment for implementing such a signalling system, it being understood that although only one such signalling arrangement is illustrated, a plurality of such arrangements would be provided in accordance with the number of signals being transmitted between platform and ground. Thus, for the system described in FIG. 1, three such arrangements would be necessary in order to provide a warning signal, a by-pass signal and a lock-out signal. For ease of illustration, FIG. 3 will be described with respect to the by-pass signal.

Signal and transition compartment 176 is interposed between the insulating column 178 and the by-pass and/or lock-out tube 170. Signal and transition compartment 176 is defined by a concentric cylinder 218 secured at one end to the lower flange 174 of the by-pass-lock-out tube 170 and secured at the other end to a ring 220 interposed between the compression springs 204 and the uppermost porcelain tube 182. Extending between the flange 194 and the top end of the signal compartment 176 is a support post 222, which supports a platform 224, outstanding therefrom. Secured to and depending from the platform 224 is the by-pass relay 90 which includes a generally E-shaped core 91 and an energizing coil 93, which is inserted in series between the line 52 in FIG. 1 and the various contacts 86A, 88A, 110A and 114A, which are in turn connected to the line 50 in FIG. 1. Associated with the core 91 is a movable armature 95, which in turn is connected to the by-pass signal rod 92 by means of a link 97. The signal rod 92 passes through the interior 188 of the insulating column 178, emerges at the other end within the enclosure 180, and is connected in turn to the double pole switch 99 which comprises the normally open contact pair 90A and the normally closed contact 90B. With the coil 93 non-energized, the return spring 101 normally biases the signal rod 92 and armature 95 downwardly such that the contacts 90A and 90B remain in the normally open and normally closed position, respectively. Upon the occurrence of the various faults, as described earlier, such that coil 93 becomes energized, the armature 95, link 97 and signal rod 92 is drawn upwardly against the bias of spring 101 such that contact 90A closes while contact 90B opens to initiate the by-pass operation in the manner explained previously.

It may be pointed out that bellows 226 and 228 cooperate with respective ends of the signalling rod 92 and with cylindrical jackets 230 and 232, respectively, in the same manner that the various bellows 206, 208, 210, and 212 cooperate with the power rods 68 and 148. Thus, compressed gas from the hollow interior 188 of the insulating column 178 escapes into the bellows 226 and 228 to exert equal and opposite tensile forces on the signalling rod 92 to maintain it in tension at all times to counteract any possible buckling effect. Simultaneously, such equal and opposite forces will have no effect and in no way interfere with the operation of the signalling rod effectuated by either the return spring 101 or activation of the coil 93.

BY-PASS AND/OR LOCK-OUT SWITCH

Turning to FIGS. 4–7, there is shown in detail a preferred embodiment of the by-pass and lock-out switch mechanism utilized in the protective system of the instant invention. As utilized in the protective system of the instant invention. As mentioned previously, the various switch components to be described are enclosed in a round insulating tube 170 of plastic material terminated at both ends in flat metallic flanges 172 and 174 that serve as connection terminals and simultaneously provide hermetic seals at both ends of the tube. Preferably, the inside of the tube is filled with an insulating gas such as $SF_6$ maintained under pressure which, as will be explained in greater detail, assures that the by-pass switch contacts will be closed in the event that there is a failure in the protective system. The two flanges 172 and 174 are held against the insulating tube 170 by means of filament rods such as 234 and 236 screw-threaded externally of the tube 170, shown, for example, at 238.

Figure 6:
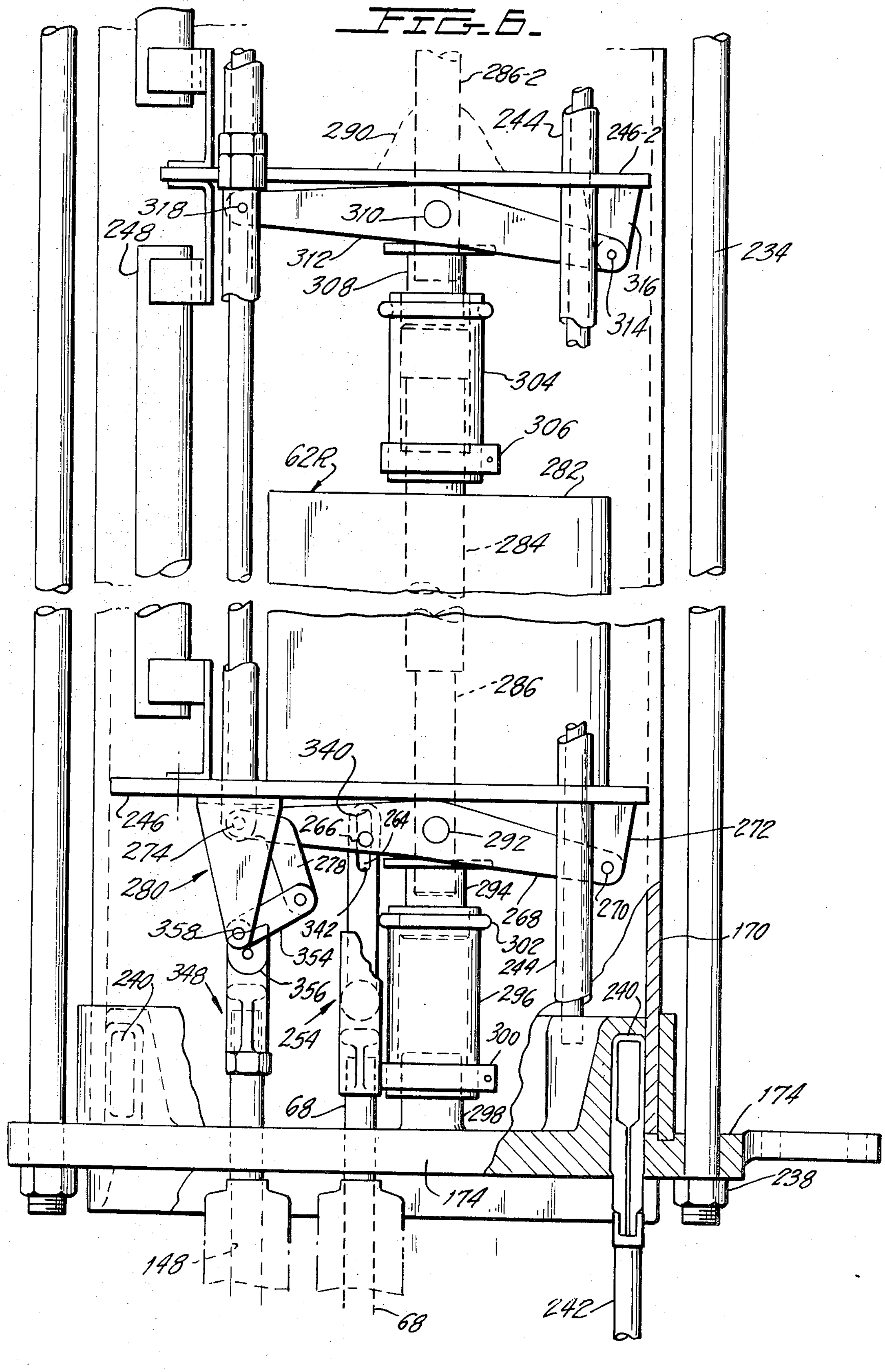
FIG. 6 is an enlarged view of a portion of the by-pass and lock-out mechanism, illustrated in FIG. 4.

As best shown by FIGS. 3 and 6, an inflatable gasket 240 is used to guarantee the seal between the tube 170 and the lower flange 174. This inflatable gasket 240 is supplied with compressed gas by a thin conduit 242, which communicates with the hollow interior 188 of the multi-purpose insulating column 178 through a termination fitting 192 in the same manner that the conduits 32 and 32A communicate with the interior 188 through their respective termination fittings. Thus another function of the gas under pressure within the insulating column 178 is to aid in sealing the tube 170.

Insulatively ssupported within tube 170, by means of support posts such as 244, are metallic platforms which, among other things, support a plurality of by-pass make contacts 62M and a plurality of by-pass reinsert contacts 62R in a manner to be further described. It is to be understood that although the by-pass and lock-out switch will be described with respect to three breaks per switch, this specific disclosure is for ease of explanation only and is in no way intended to limit such by-pass construction to only three breaks, as it will become apparent that more or less breaks per switch can be used if desired. In this connotation, a break is intended to mean at least one set of by-pass make contact 62M in electrical parallel with at least one set of cooperating reinsert break contacts 62R. However, in the instant disclosure, and with reference to FIG. 5A, the instant invention utilizes two make contacts 62M in parallel with each break contact 62R. Regardless of the number of breaks utilized, a voltage divider network comprising resistors 248 of high ohmic value, is established in parallel with each of the breaks of the switch in order to evenly distribute the total potential difference existing between terminals 172 and 174 across the number of breaks being utilized.

Beginning with the by-pass power rod 68, and with reference to FIG. 3, the rod 68 sealingly but slidingly enters the tube 170 by means of the cooperation established by bellows 250 and cylindrical jacket 252. Once within the tube 170, the by-pass power rod 68 is secured to a generally E-shaped crossbar 254 schematically illustrated in FIG. 7 and shown in detail in FIGS. 4, 5C and 6.

Cross piece 254 has secured to its outstanding arms, rods 256 and 258 which operate each string of make contacts 62M in a manner to be further described. The central leg of the crossbar 254 includes a pair of forked struts 260 (see FIG. 5C) at one end rigidly secured to a pedestal support 262, and at the opposite end bearing elongated slots 264 which slidably contain a pin 266 which is carried by an aperture through a lever arm 268.

Lever arm 268 is pivoted at one end 270 to an anchor 272 depending from the platform 246. At the other end 274, the lever arm 268, is linked to a connection rod 276 and to one leg 278 of a latch arrangement 280, the function of which will be explained in greater detail.

As must be apparent from the terminology, the function of the reinsert contacts 62R is to open the by-pass switch, and thereby reinsert the capacitor bank 12, once the various abnormalities associated with the by-pass protective scheme have subsided. Since such reinsertion contact 62R will be opening upon a circuit carrying the line current, means must be provided to extinguish any arc drawn during the insertion process. To this end, each of the reinsertion contacts 62R preferably comprises a vacuum type of interrupter switch including an evacuated chamber 282 within which is situated a fixed contact 284 and a movable contact 286 which is slidable through the lower end wall of the containers 282. The evacuated integrity of the containers 282 is assured by means of bellows arrangements 290 one end of which is secured to the movable contact 286 and the opposite ends of which are sealed to the interior surface of the lower end wall of the container 282.

As noted previously, the interior of tube 170 is filled with gas under pressure. Thus, in the event of failure of power rod 68, or indeed the failure of any other mechanism, the gas under pressure with the tube 170 will always exert force on the interior of the bellows 290, such that movable contact will always move to its closed circuit condition, illustrated in FIG. 6. This adds a "failsafe" characteristic to the by-pass system.

Beginning with the lowermost reinsert contact 62R, shown in FIG. 6, movable contact 286 issues through the support plate 246 and is secured to an intermediate point 292 on the lever arm 268 and also to a piston-like structure 294 which is slidably movable within a hollow cylindrical sleeve 296, the far end of which is clamped to an upstanding terminal pad 298 of the flange 174 by means of circumscribing band 300. Garter spring 302 at the other end of sleeve 296 ensures firm electrical contact between the piston-like structure 294 and the sleeve 296. The stationary contact 284, upon exiting from the container 282, is rigidly secured within a second conductive sleeve 304 by means of band 306. The hollow interior of sleeve 304 slidably receives piston-like structure 308, which in turn is connected to movable contact 286–2 of the second break contacts 62R. Movable contact 286–2 is also connected at a point 310 to a second lever arm 312 which is pivoted at end 314 to a second anchor depending from the second support platform 246–2.

The opposite end 318 of lever arm 312 is pivotally secured to the connection rod 276, such that rotation of the lowermost lever arm 268 about pivot point 270 by the power rod 268 (in a manner to be further described) not ony retracts lowermost contact 268 but also through the connection rod 276 and lever arm 312, retracts movable contact 286–2 thereby interrupting the flow of current in the second break contact 62R as well as in the first. See also FIG. 7.

Figures 2B, 7:
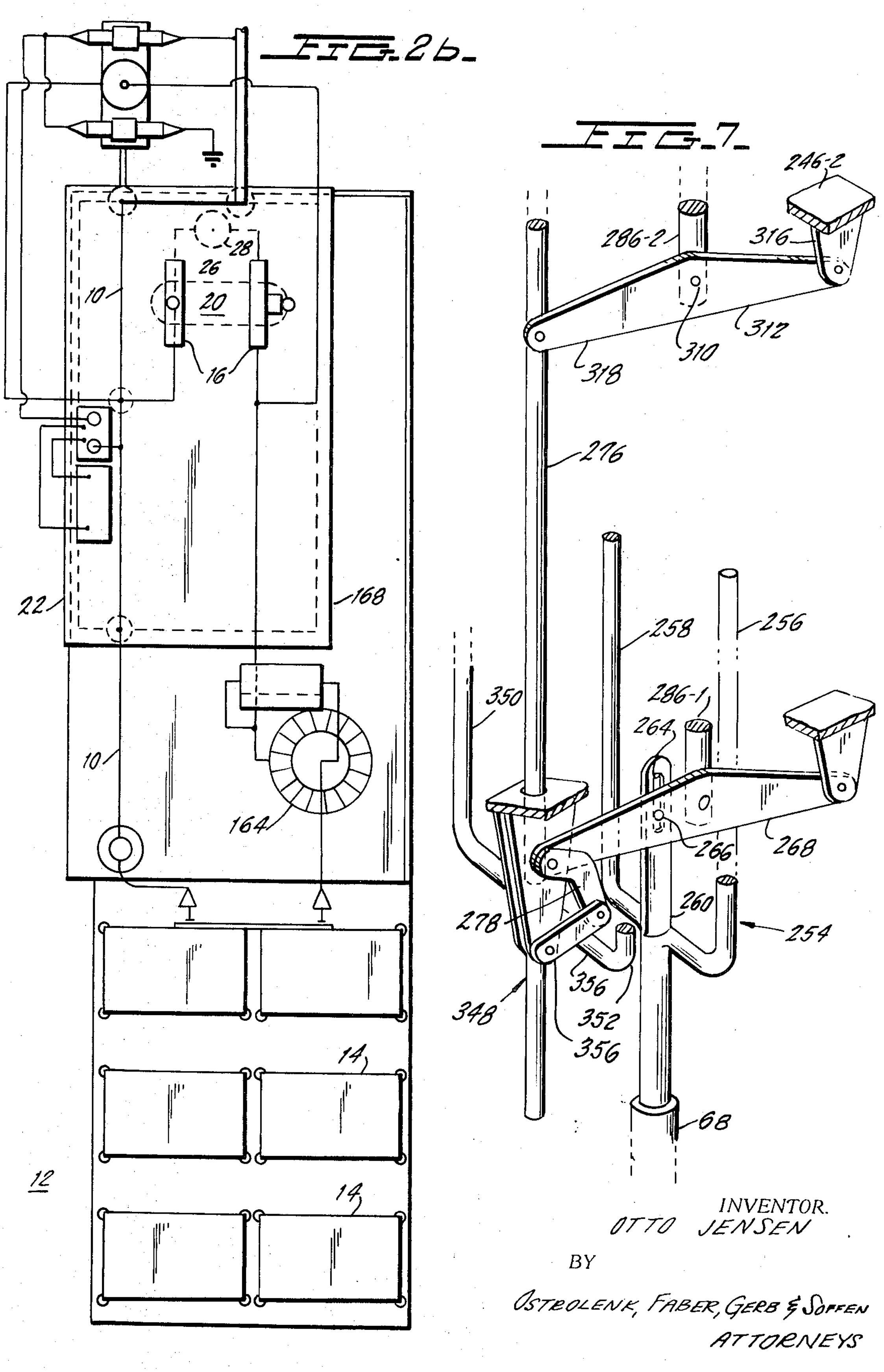
FIG. 2B is a plan view of the system of FIG. 2A.
FIG. 7 is a somewhat schematic perspective view of the by-pass lock-out mechanism of FIG. 4, illustrating the relationship of some of the elements shown therein.
Figures 4, 5A, 5B, 5C, 5D:
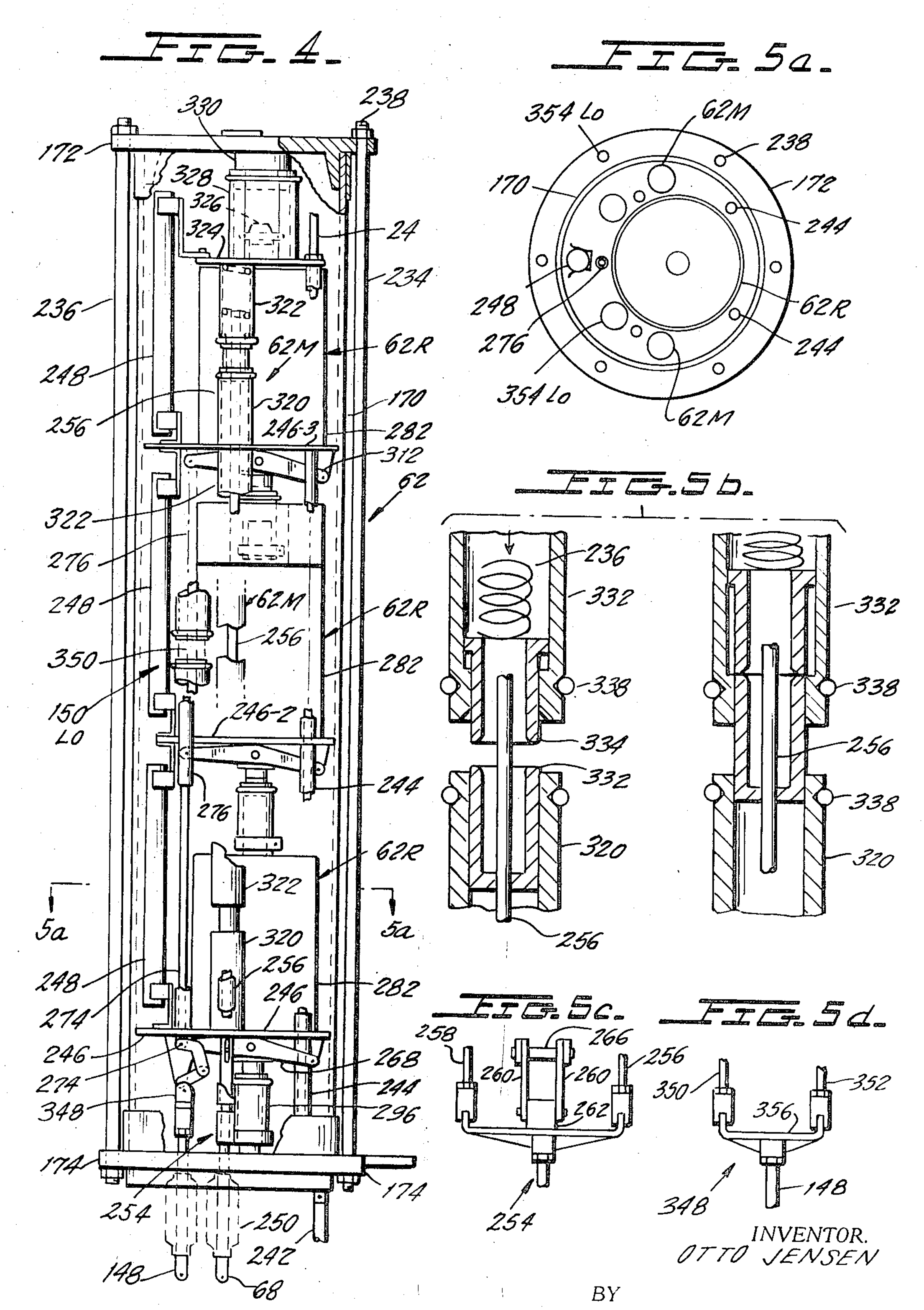
FIG. 4 is a view partly in section showing the by-pass and lock-out switch used in the system of the instant invention.
FIG. 5A is a view taken along the arrows 5A, 5A of FIG. 4.
FIGS. 5B, 5C and 5D show various components of the by-pass switch illustrated in FIG. 4.

Although not specifically shown in FIGS. 6 or 7, it will be appreciated from FIG. 4 that a similar interconnection is established with the uppermost break contacts 62R shown in FIG. 4, and would be established with any such number of break contacts being used between the terminals 172 and 174. The essential function performed by the interconnecting structure is to simultaneously open the series connected break contacts 62R such that the capacitor bank will be reinserted.

Turning now to the two strings of make contacts 62M, located (as shown in FIG. 5A) on opposite sides of the associated break contacts 62R; as the terminology suggests, the make contacts 62M are utilized to initially establish a by-pass circuit about the capacitor bank 12 when a fault has been detected. Since completing a circuit, rather than interrupting one is their function, no elaborate arc interruption system (such as the vacuum type of arc contacts provided by 62R) need be provided. Instead a novel spring plunger type of arrangement, to be described in greater detail, is provided to initially carry any pre-strike arc which would otherwise exist between the mating surfaces of the make contacts 62M, thereby materially protecting these current-carrying surfaces from erosion.

As best shown in FIGS. 4 and 5B, each make contact 62M comprises a first conductive tubular member 320 supported by and electrically connected to a respective conductive support platform 246 and a second tubular conductive sleeve 322, electrically connected to and supported from either a support platform or from conductive plate 324 in the case of the uppermost make contact 62M, which in turn is electrically connected through a conductive protrusion 326 and a conductive sleeve 328 to a depending conductive protrusion 330 of the end flange 172.

In each make contact 62M, the uppermost cylindrical sleeve 322 functions as a stationary contact while a conductive slide 332 movable within the conductive sleeve 320 functions as a movable contact (see FIG. 5B). Actually even the stationary contact structure 322 includes a cylindrical plunger portion 334 which is continuously biased downwardly by internally located springs 336. The conductive slides 332 are all rigidly secured to rods 256 and 258, respectively, which as pointed out previously are secured to cross piece 254 which, in turn, moves vertically up and down in response to the movement of by-pass power rod 68.

In operation, upward movement of rod 256 and 258 moves the conductive slide 332 upward until it engages the conductive plunger 334 (and any pre-strike arc is carried by the tips of those two cooperating members). Finally, conductive slide 332 enters stationary conductor sleeve 332 to complete the make operation. On the downward sweep of rods 256 and 258, the sequence is reversed. Garter springs 338 assure firm electrical contact between the moving parts.

It will be appreciated that since all make contacts 62M are operated by rods 256 and 258 which are joined to one another through the cross piece 254, then the making operation simulates the closing of a single contact, such as was schematically illustrated at 62 in FIGS. 1 and 2A between the terminals 172 and 174. Similarly, as mentioned earlier, all of the break contacts 62R may be effectively treated as the opening of the contact 62 in the schematics of FIGS. 1 and 2A. The reason for the separate make and break contacts to perform the by-pass and reinsert operation is, as was suggested earlier, the need for arcing contacts upon a reinsertion cycle and the desire of pre-strike contacts during a by-pass operation. Thus, it will be appreciated that means must be provided to interrelate the make and break contacts illustrated in FIGS. 4–7, such that during a reinsert operation, the make contact 62M separate first, leaving the break contacts 62R with their attendant vacuum interruption process to open last and interrupt any arc which may persist. Similarly, in a by-pass operation, the interrelationship must be such that the make contacts with their pre-strike plunger arrangement make first, followed by the closing of the break contacts 62R. This sequence of operation is in fact guaranteed by the interrelationship of the make and break contacts 62M and 62R, respectively, established by the cross piece 254 in the following manner:

Assuming the capacitor bank 12 to be by-passed such that make contacts 62M and break contacts 62R are all in their closed circuit condition (FIG. 4), and further assuming that the particular fault which caused the initial by-pass has subsided, it will be recalled that a signal will be sent from the platform to ground by the by-pass signal rod 92, which, in turn, will cause the energization of the insert trip coil 76, which, in turn, will permit the release of by-pass stored energy mechanism 66. The released springs thereof rotate arm 78 causing a downward pull on the by-pass power rod 68.

As best seen in FIGS. 6 and 7, downward motion of power rod 68 will immediately pull rods 256 and 258 downward, thereby initiating the opening of the make contacts 62M in the manner previously described with respect to FIG. 5B. However, since the pin 266 is carried in elongated slots 264 of the forked struts 260, the initial downward movement of the cross piece 254 will have no effect upon the movable contacts 286 of the break contacts 62R. Thus the first step in an insert operation would be the opening of the make contact 62M. Finally, when the center struts 260 of the cross piece 254 are sufficiently lowered such that the pin 266 engages the uppermost portion 340 of the slot 264, then the lever arm 268 (and the other lever arms such as 312) will begin to rotate counterclockwise in FIG. 6 to initiate the opening of the break contacts 62R.

In the by-pass operation the sequence is just the opposite. Assuming an abnormality has been detected on the line. the signal conveyed to the ground, and by-pass operating mechanism released; the power rod 68 would be lifted vertically through the insulating column 178 and signal and transition chamber 176. Consequently, the cross piece 254 and the rods 256 and 258 would be simultaneously lifted to initially cause the closing of the make contacts 62M, as was described in FIG. 5B. Only after the pin 266 was reached by the lower end 342 of the slot 264 would the break contacts 62R close.

Lock-out mechanism shown in FIGS. 4–7 is similar to the by-pass mechanism described above. That is, the lock-out power rod 148 issues through bellows 344 and cylindrical jacket 346 (see FIG. 3) into the tube 170 of the by-pass lock-out housing, where it is rigidly connected to a crosspiece 348, best seen in FIG. 5D. The crosspiece 348 has secured thereto operating rods 350 and 352 which operate two strings, of three each, lock-out shunt contacts 150LO (shown only in FIGS. 4 and 5A). Lock-out shunt contacts operate in exactly the manner described for the by-pass make contacts 62M and include the pre-strike plunger arrangement illustrated in FIG. 5B. Hence a detailed repetitive description is thought unnecessary. The two strings of lock-out contacts 150LO function simultaneously under the direction of the lock-out power rod 148, it is the equivalent of the schematic representation of lock-out switch contact 150 in FIGS. 1 and 2A interposed between the terminals 172 and 174.

As noted previously, lock-out operation normally occurs only when the particular fault which initially caused a by-pass operation has not subsided within a predetermined time interval. It is apparent therefore that the sequence of operation, starting from a normal line current will be: detection of an abnormality, a by-pass operation (initiating closing of the make contacts 62M and the closing of break contacts 62R, in that order); and then if the fault does not subside within the prescribed interval, the lock-out operation which brings about the closing of contact 150LO. As the instant invention uses only one set of vacuum interrupter switches, 62R, it is crucial that in the reinsertion operation following both a by-pass and lock-out, lock-out contacts 150LO open before the by-pass contacts 62M and 62R. If the by-pass contact 62M and 62R should open before the lock-out contacts 150LO, there will be no means to extinguish an arc which may be drawn between the cooperating contact surfaces of the lock-out contacts.

The latch mechanism 280, previously referred to, performs this function of assuring the proper sequence of this operation when there has been a by-pass and lock-out. Specifically, and with reference to FIGS. 6 and 7, wherein both the by-pass and lock-out contacts are shown in their closed circuit condition, it will be seen that a second leg 354 of the latch arrangement 280 bears against the center portion 356 of the bifurcated crosspiece 348. Thus, until the lock-out contacts 150LO have been opened by the downward pull of the rods 350 and 352 generated by the downward pull of the lock-out power rod 148, the latch mechanism 280 cannot rotate about pivot point 358 and consequently neither the lever arm 268 nor the connection rod 276 can be moved. Thus, the operator must first open the lock-out contacts before he can open the by-pass contacts and as such the vacuum interrupters 62R will always be available for circuit interruption.

It will be appreciated that the by-pass and lock-out switches herein described are extremely quick-acting because of the quick make and break capabilities made possible by a short stroke push-pull power rod. This operation is to be contrasted with the use of large, high interior, and therefore slow disconnect switches which have been suggested in the prior art.

Although there has been described a preferred embodiment of the novel invention, many variations and modifications will now be apparent to those skilled in the art. Therefore, this invention is to be limited, not by the specific disclosure herein, but only by the appended claims.

From the above detailed description of the entire system, it will be appreciated that the instant invention makes possible the transmission of information between points of different potentials.

Although this invention has been described with respect to its preferred embodiments, it should be understood that many variations and modifications will now be obvious to those skilled in the art, and it is preferred, therefore, that the scope of the invention be limited only by the specific disclosure herein, but only by the appended claims.

The embodiments of the invention in which an exclusive privilege or property is claimed are defined as follows:

1. A signalling system for transmitting information between first and second points of different potential; said signalling system comprising:

information transmission control means operable at the potential of said first point for generating information signals in response to the occurrence of predetermined conditions; and information signalling means responsive to said information signals for insulatingly transferring said information to preselected mechanism operable at the potential of said second point;

wherein said preselected mechanism is dependent upon the potential level of said second point for its operation; and further including voltage divider means connected between said first and second points, said voltage divider means providing the potential level of said first point at one end to operate said information transmission control means and providing the potential of said second point at its other end to operate said preselected mechanism.

2. The signalling system of claim 7, wherein said information signalling means includes:

normally non-energized coil means energized in response to the reception of said information signals;

armature means cooperating with said coil means and moved from a first position to a second position in response to energization of said coil means;

insulative coupling means joined to said armature means at one end and to said preselected mechanism at its other end;

whereby information generating at said first point can be insulatively transferred to said second point.

3. The signalling system of claim 2, and further including hollow insulative protective means housing a portion of said insulative coupling means which traverses between said first and second points.

4. The signalling system of claim 3, wherein said hollow insulative protective means is closed at both ends by sealing means and the interior of said hollow insulative protective means is filled with compressed gas to better insulate said interior against the potential difference existing between said first and second points.

5. The signalling system of claim 4, wherein said insulative coupling means is a rod slidably passing through the sealing means at both ends of said hollow insulative protective means; and further including bellows means at each end of said protective means cooperating with a respective one of said sealing means and an end of said rod for preventing the escape of said compressed gas from said interior while still permitting slidable movement of said rod.

6. The signalling system of claim 5, wherein a first end of the bellows means at each end of said protective means is sealingly and rigidly joined to said respective end of said rod and a second end of said bellows means is sealingly and rigidly joined to said respective sealing means on the respective end of said protective means; the interior of the respective bellows means communicating with the interior of said hollow protective means whereby the compressed gas in said interior will generate equal and opposite forces on said respective bellows such that equal and opposite forces will be applied to said rod to constantly maintain it under tension.

7. The signalling system of claim 1 wherein said information signalling means includes a rod of insulating material connected between a portion of said information signalling means which is at the potential of said first point and said preselected mechanism which is at the potential of said second point.

8. The signalling system of claim 7 and further including hollow insulative protective means slidably housing said rod therethrough; said protective means further supporting said voltage divider means.

9. The signalling system of claim 8 wherein said voltage divider means comprises a plurality of capacitors in electrical series between said first and second points, one of said capacitors nearest said first point providing the potential therefore, and one of the capacitors nearest said second point providing the potential therefore; and wherein said voltage divider means comprises a plurality of capacitors in electrical series between said line and ground, one of said capacitors nearest said line providing said platform level potential, and one of said capacitors nearest ground level providing said ground level potential; and wherein said hollow insulative protective means comprises a plurality of modular hollow insulator sections separatingly stacked upon one another by a plurality of outstanding flanges, each one of which supports one of said capacitors.

10. The signalling system of claim 9 wherein said hollow insulative protective means is closed at both ends by sealing means and the interior of said hollow insulative protective means is filled with compressed gas to better insulate said interior against the potential difference existing between said first and second points.

11. The signalling system of claim 10 wherein said rod is slidable through the sealing means at both ends of said hollow insulative protective means; and further including bellows means at each end of said protective means cooperating with a respective one of said sealing means and an end of said rod for permitting the escape of said compressed gas from said interior while still permitting slidable movement of said rod.

12. The signalling system of claim 11 wherein a first end of the bellows means at each end of said protective means is sealingly and rigidly joined to said respective end of said rod and a second end of said bellows means is sealingly and rigidly joined to said respective sealing means on the respective end of said protective means; the interior of the respective bellows means communicating with the interior of said hollow protective means whereby the compressed gas in said interior will generate equal and opposite forces on said respective bellows such that equal and opposite forces will be applied to said rod to constantly maintain it under tension.

References Cited

UNITED STATES PATENTS 3,227,925 1/1966 Cook ---------------- 317—58

JAMES D. TRAMMELL, Primary Examiner

U.S. Cl. X.R.

200—146; 317—58, 59

UNITED STATES PATENT OFFICE
CERTIFICATE OF CORRECTION

Patent No. 3,543,089 Dated November 24, 1970

Inventor(s) Otto Jensen

It is certified that error appears in the above-identified paten and that said Letters Patent are hereby corrected as shown below:

Column 17, line 37, "7" should be --- 1 ---

Signed and sealed this 19th day of October 1971.

(SEAL)
Attest:

EDWARD M.FLETCHER,JR.
Attesting Officer

ROBERT GOTTSCHALK
Acting Commissioner of Pat